US007503320B2

United States Patent
Collet

(10) Patent No.: US 7,503,320 B2
(45) Date of Patent: Mar. 17, 2009

(54) METHOD OF OPERATING AN ENGINE AT IDLE SPEED FOR OPERATIONAL DIAGNOSIS OF A PURGE VALVE

(75) Inventor: Thierry Collet, Fontenilles (FR)

(73) Assignee: Continental Automotive France, Toulouse Cedex (FR)

(*) Notice: Subject to any disclaimer, the term of this patent is extended or adjusted under 35 U.S.C. 154(b) by 43 days.

(21) Appl. No.: 11/797,957

(22) Filed: May 9, 2007

(65) Prior Publication Data

US 2007/0283924 A1  Dec. 13, 2007

(30) Foreign Application Priority Data

May 12, 2006  (FR) .................................. 06 04216

(51) Int. Cl.
*F02M 25/07* (2006.01)
*B60T 7/12* (2006.01)

(52) U.S. Cl. .................. 123/698; 123/568.11; 123/520; 701/108

(58) Field of Classification Search ................ 123/698, 123/699, 700, 518, 519, 520, 434, 568.11, 123/568.21; 701/101, 108, 114
See application file for complete search history.

(56) References Cited

U.S. PATENT DOCUMENTS

| 5,216,991 | A | 6/1993 | Iida et al. |
| 5,243,853 | A | 9/1993 | Steinbrenner et al. |
| 5,575,267 | A | 11/1996 | Matsumoto et al. |
| 6,715,462 | B2* | 4/2004 | Bidner et al. ............ 123/198 F |
| 6,769,398 | B2* | 8/2004 | Surnilla et al. .......... 123/339.19 |
| 2003/0221417 | A1* | 12/2003 | Surnilla ........................ 60/284 |
| 2004/0182374 | A1* | 9/2004 | Surnilla ....................... 123/674 |
| 2006/0154784 | A1* | 7/2006 | Surnilla et al. ............... 477/111 |

FOREIGN PATENT DOCUMENTS

WO  90/13738  11/1990

* cited by examiner

*Primary Examiner*—John T Kwon
(74) *Attorney, Agent, or Firm*—Young & Thompson

(57) ABSTRACT

This in particular involves testing the operation of a fuel vapor purge valve (31). The engine (1) is running at idle. An idle speed controller (ISC, 47) acts on the engine idle speed. At a given moment in this operation of the engine, a command to open the purge valve (31) is issued and the idle speed controller is also operated in such a way that it acts on this speed to keep it substantially constant in spite of the fact that the purge valve is open.

4 Claims, 2 Drawing Sheets

Figure 1:
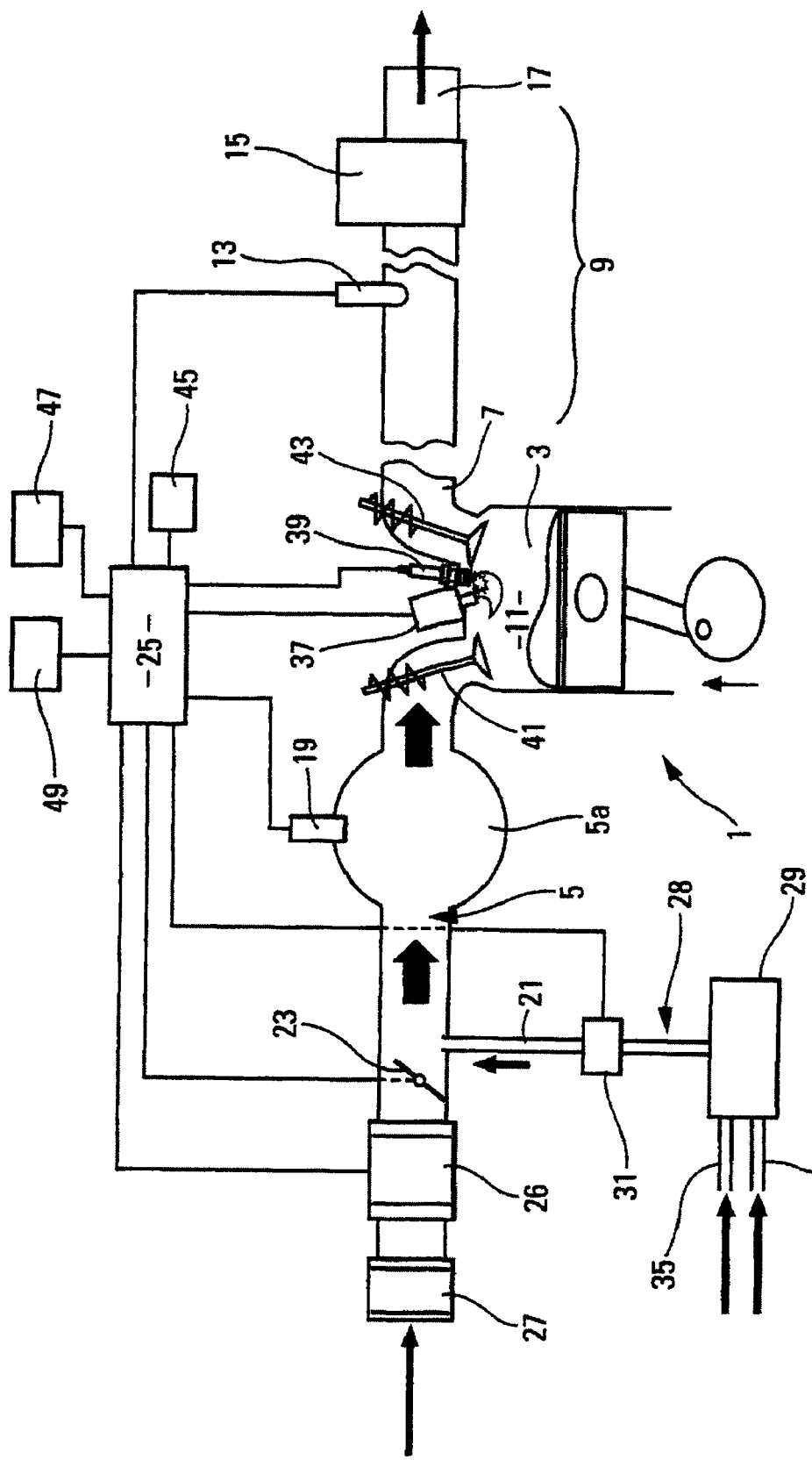

METHOD OF OPERATING AN ENGINE AT IDLE SPEED FOR OPERATIONAL DIAGNOSIS OF A PURGE VALVE

The present invention relates to diagnostics of the purge valve ("canister") that a motor vehicle internal combustion engine comprises. A "canister" is a fuel vapor trap.

In a modern internal combustion engine, it is essential that there be a fuel vapor canister for emission control purposes.

The device which accommodates it allows vapors escaping from the fuel tank to be treated and stored so that they can be recirculated when the fuel vapor canister is purged by introducing them into the engine air inlet manifold.

Thus, fuel vapors which might otherwise have escaped into the atmosphere were the device not present are recirculated into the engine and used as fuel.

This purging of the fuel vapor canister is brought about by an electrically operated valve, itself driven by the ECU (the "engine control unit" also known as the "power unit control module" or PCM).

It is in the interest of the engine control system to diagnose any malfunction of this electrically operated valve which has to open and close when commanded to do so.

Usually, operation of the electrically operated valve is diagnosed by checking it has actually opened. Thus, a check is made to ensure that the valve has opened by examining the influence that this opening has on the operation of the engine, typically at idle speed.

The ECU/PCM, hereinafter termed the "ECU", calculates the mass flow rate through the electrically operated valve. This value is added to the value of the mass flow rate measured upstream of the valve (a butterfly valve that can be turned, for example) which regulates the flow of air into the inlet manifold, so that this value can be taken into consideration for managing the (or at least some of the) other engine control parameters. The calculated mass air flow rate into the air inlet manifold governs the amount of fuel to be injected, this amount itself governing the production of torque, the engine speed and the gaseous emissions from the engine in the exhaust.

When the fuel vapor canister purge valve is opened, the ECU modifies the engine control parameters in order to maintain normal operation of this engine, that is to say, operation that is not appreciably disrupted by the purging in progress. The engine idle speed is regulated using an idle speed controller of the PID type (a "PID controller" which is a controller of the proportional, integral, derivative type).

One of the ways to diagnose correct operation of the electrically operated purge valve is to monitor the behavior of the idle speed which this electrically operated valve (typically an on/off solenoid valve) is made to open.

In such a diagnostics mode, the driver may perceive the variation in engine speed, which he has not called for himself, and erroneously conclude from this that the internal combustion engine of his vehicle is not running correctly.

Solutions to this situation have already proposed monitoring other indicators (flow rate in the air inlet manifold, the value read by a LAMBDA probe in the exhaust, etc.).

However, monitoring the change in engine speed proves to be a reliable and advantageous way of diagnosing correct operation of the electrically operated valve.

It is one object of the invention to avoid, or at least to limit, the aforementioned problem associated with this variation in engine speed that a driver may feel or identify, at idle, particularly in the diagnostics mode, and/or when a fuel vapor canister purge valve is opened, on an internal combustion engine.

One solution proposed in the invention consists of a method for operating the engine, when it is therefore at idle and its speed is controlled by a controller ISC, in which method, at a given moment in the operation of this engine at idle, a command to open the fuel vapor canister purge valve will be issued and the idle speed controller ISC will also be operated in such a way that it acts on said engine idle speed without causing an appreciable variation in this speed in spite of the fact that the purge valve is open.

Thus, when this valve is open (or in spite of the fact that this valve is open), the engine idle speed will be kept (substantially) constant whether or not the valve has actually opened correctly.

Preferably, the idle speed controller (ISC) and the engine control unit (ECU, PCM) will be operated using a PID controller that has proportional, integral and derivative functions.

Furthermore, provision is preferably made for the keeping of the engine speed at idle with the purge valve open appreciably the same as it is when the purge valve is closed, to be combined with an analysis of data supplied to the engine control unit (ECU, PCM) by the PID controller, this analysis being used to supply diagnostics information regarding the operation of the purge device and/or of said purge valve.

In this context, it is also advisable for the analysis of this data to comprise an analysis of the change of the integral function in order to diagnose whether the purge device is operating correctly.

In practice, it is also advisable for the analysis in question, which leads to the diagnosis, to comprise the following steps:

a) storing in the memory of the engine control unit (ECU, PCM) at least one value read from the integral function of the PID controller associated with the idle speed controller (ISC) before the command to open the purge valve is issued, b) supplying the engine control unit (ECU, PCM) with at least one value read from the integral function of the PID controller once the command to open said purge valve has been issued, c) comparing the values read at steps a) and b), d) establishing the diagnosis on the basis of the results of the comparison performed.

Figure 2:
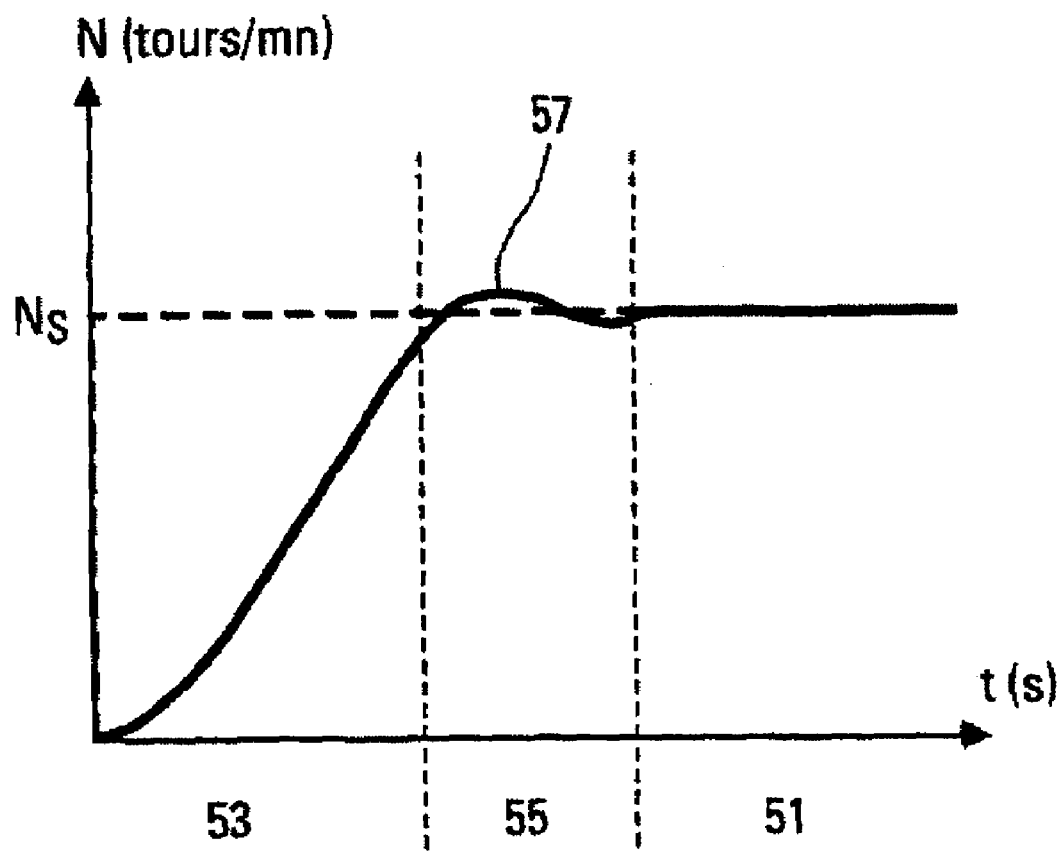

Other features and advantages of the invention will become further apparent from the description which will follow which provides one exemplary embodiment, without implying any limitation, in conjunction with the attached drawings in which:

FIG. 1 schematically depicts, in conjunction with the invention, a collection of means present in a vehicle internal combustion engine and which contribute to its operation, FIG. 2 shows a curve of the change in a PID controller as advantageously used in the context of the invention.

FIG. 1 schematically shows part of a vehicle internal combustion engine 1. One of the cylinders 3 of this engine communicates, upstream, with the air inlet manifold 5 and, downstream, with the exhaust manifold 7 which itself communicates with the exhaust system 9.

Downstream of the exhaust manifold 7 through which the burnt gases produced in the combustion chamber 11 are discharged, is the exhaust system 9 comprising a lambda probe 13 positioned upstream of a catalytic converter 15 mounted on the catalytic exhaust system 17 of the vehicle through which the exhaust gases are discharged into the atmosphere.

The lambda probe 13 is an oxygen probe used to measure the richness of fuel/air mixture supplied to the cylinders of the engine, and therefore, in particular, to the cylinder 3. It is positioned very precisely because its position governs the effectiveness of the measurement taken by the probe, which is therefore designed to detect the amount of oxygen present in the exhaust gases.

In the air inlet manifold 5 there is a chamber 5a housing a pressure sensor 19 that senses the pressure of the fluid flowing through this manifold. This sensor is typically of the MAP (manifold absolute pressure) sensor type.

Further upstream the air inlet manifold 5 communicates with a fuel vapor recirculation pipeline 21 which opens into the inlet manifold 5 downstream of the valve 23 (or butterfly valve) that allows greater or lesser amounts of air into the manifold 5 typically according to the command transmitted by the engine control unit (ECU) 25.

This engine control unit 25 therefore corresponds to the power unit control module. Connected to a certain number of sensors and actuators, it controls, in particular, the distribution of fuel, the idle speed, the ignition advance timing and the gaseous emissions systems.

The valve 23 in the inlet manifold 5 is situated downstream of the mass flow meter 26 (MAF sensor sensing incoming mass air flow rate) whose task is to measure the amount of air admitted to the manifold 5 from the external air intake 27 that is open to the atmosphere.

A fuel vapor recirculation pipeline 21 receives a certain amount of fuel vapors from the storage volume of the fuel vapor canister 29, when the electrically operated valve 31 placed on the pipeline 21 is open.

Typically, the fuel vapor canister 29 belongs to a storage/purge device 28 and receives the fuel vapors from a pipeline 33 connected to the fuel tank of the vehicle. It receives a certain amount of external air via a pipeline 35 open to the atmosphere.

The forthcoming explanations regarding fluid pressures could be applied to circulating fluid flow rates and vice versa.

When the engine 1 (embodied here essentially in the form of its cylinder 3) is in operation, and outside of periods in which the fuel vapors contained in the storage volume 29 of the canister are being purged (the electrically operated valve 31 therefore being assumed to be closed), the pressure sensor 19 detects the air pressure in the air inlet duct 5 which is therefore not receiving any vapor from the pipeline 21.

This value is transmitted to the ECU 25 where the mass air flow rate (MAF-CYL) entering the cylinder(s) is calculated in a way known per se.

At least one of said values is transmitted by the ECU in order to define the amount of fuel to be supplied to each cylinder in order to obtain optimized combustion conditions.

Typically, the data supplied by the lambda exhaust probe 13 is taken into consideration by the ECU to adjust the amount of fuel injected into the cylinder 3 by the injector 37, the fuel/air mixture therein being ignited by the spark plug 39, the operating cycle of which is controlled by the ECU, the respective inlet 41 and exhaust 43 valves participating in the customary successive operating cycles of the engine by timing the inlets of fluid (oxidizing air) from the air inlet duct 5 and the expulsion of exhaust gases to the exhaust system 9.

During periods in which the fuel vapors contained in the storage volume 29 are being purged, the electrically operated valve 31 is supposed to be open and a certain amount of fluid containing these vapors is supposed therefore to arrive in the inlet duct 5 via the pipeline 21.

This vapor purge period is typically designed to occur while the engine 1 is at idle speed. As is known per se, the butterfly valve/the valve 23 is then advantageously under the control of an idle air controller (IAC) 45 and of an idle speed controller (or actuator) (ISC) 47 which are functionally connected to the ECU.

The controller ISC will here act on this engine idle speed on the basis of the fluid mass flow rate passing through the purge valve 31, or a physical parameter associated with this mass flow rate, such as pressure, for example.

As has already been stated, the fluid arriving from the pipeline 21 may comprise a mixture between fuel vapors from the pipeline 33 and external air from the pipeline 35, it being possible for these to be metered using known means.

Typically, using the difference in pressure between the pressure read by the sensor 19 and the ambient pressure, the ECU 25 is able to estimate (to calculate) the value of the mass flow rate passing through the electrically operated purge valve 31, for example using a modeling table stored in the memory and which was devised on a test bed.

Once the value of this mass flow rate passing through the electrically operated valve 31 has been calculated, this value may be typically added to the air mass flow rate value measured by the flow meter 25 upstream of the valve 23, and may thus be taken into consideration, still by the ECU, to govern the other engine control parameters (mass flow rate of fuel, injection cycle for each injector 37, etc.).

Typically, the fact that the electrically operated valve 31 is open is checked by observing, at the ECU and by way of data supplied by the sensors such as 13 and 19, the influence that this opening has on the operation of the engine.

However, it was mentioned at the start of the description that there are imperfections in this approach (when used alone).

In order to be able to establish a better quality diagnosis and/or in particular to avoid disruption and the questions, already mentioned, that the driver may ask himself, the proposal here is to proceed as follows, preferably when the engine is in the idle phase and at least during the/each step of diagnosing the operation of the device 28, and in particular the correct reaction of the electrically operated valve 31 when commanded by the ECU to open.

Moving directly on to the favored control mode that it is advised to implement, the invention will seek to alleviate the problem(s) observed by maintaining the engine idle speed during the fuel vapor purge phase (including therefore when the valve 31, has opened correctly which is assumed to be the most probable scenario), this advantageously being achieved by using, in combination, the PID controller 49 (which is a known controller with proportional, integral and derivative functions) and the idle speed controller ISC 47, both connected to the ECU 25, and by monitoring the "integral" part 51 of the typical evolution curve output by the PID controller (see FIG. 2).

For whatever purpose it may serve, FIG. 2 shows the first and second parts of a typical evolution curve from such a controller whose aim, over time, is to stabilize the engine speed N to the output value $N_s$: a phase of action in proportional terms 53 followed by the phase of action in derivative terms 55 where typically the greatest excesses 57 are observed, followed by stabilization toward the output signal corresponding to the speed $N_s$.

In the context of checking the operation of the purge device 28, the monitoring of this "integral" part of the PID evolution of the idle speed controller 45 will be applied to diagnosing the operation of the electrically operated valve 31.

To do this, when initiating the diagnostics mode of the device 28 at the idle speed, the electrically operated purge valve 31 will be commanded to open by the ECU 25 so that the PID speed controller 45-47 can act and avoid any variation in engine idle speed, thus allowing the driver not to perceive any variation, or at least any variation that he would consider significant, in the engine speed, in spite of the increase in mass flow rate through the inlet manifold 5.

In practice, when the command to open this valve 31 is issued, the ECU will control this valve and/or the valve 23 for the inlet manifold 5 in such a way that the fuel/air mixture let into the cylinders is tailored to the desired maintaining (without appreciable variation) of the idle speed, as already mentioned, in conjunction with action of the PID controller (49) and/or of the controller ISC 47.

Thus, the engine control system, and therefore the ECU 25 in particular, will analyze the deviation in the "integral" part 57 of the PID controller (which will have to vary if the electrically operated valve 31 has not opened and the estimated amount of fluid has therefore not reached the air inlet duct 5 via the pipeline 21) in order to maintain the engine idle speed that existed more or less at the time the command to open this electrically operated valve was issued, and to maintain it throughout the indicated diagnostics phase.

Thus, even though the engine speed N is not going to vary, as far as the driver's perception of it is concerned, the ECU 25 will receive information allowing it to diagnose correct or incorrect operation of the purge device 28 and, in particular, of the electrically operated valve 31 which typically constitutes its most sensitive element.

In practice, the solution encouraged here makes provision for the memory means associated with the ECU 25, when the diagnostics mode of the device 28 is initiated by this ECU, to store the value read from said integral part 51 of the PID controller in memory before the electrically operated valve 31 is opened. In other words, the PID controller 49 will transmit the value of the integral term to the ECU 25 and the ECU 25 will store it in memory while the purge valve is closed.

Once the command has been issued to open this valve, other values of the integral term will then be transmitted to the ECU 25 by the PID controller, these values therefore corresponding to values read while the electrically operated valve is supposed to be opening following the command received.

By comparing the reference value stored in memory prior to opening with these values during and/or after opening, the processing means of the ECU 25 will be able to diagnose whether the purge device is operating correctly or incorrectly.

In particular, these diagnostics may be performed by comparison against a threshold value.

If the pre-established stored threshold value is reached, operation of the device 28 and therefore of the electrically operated valve 31 will be deemed correct, otherwise an error message will be transmitted for action.

The diagnostics method relating to the operation of the purge device 28 has been described in respect of an idle speed. It may, however, be envisioned for steady-state engine speed conditions.

The invention claimed is:

1. A method for operating an internal combustion engine (1) at idle speed (47), the engine (1) being equipped with a purge device (28) comprising a purge valve (31) for purging a fuel vapor canister communicating, via a vapor pipeline, with an air inlet manifold (5) of the engine (1) in order to recirculate at least some of these vapors thereto when the valve (31) is open, in which method an idle speed controller (ISC, 47) acts upon the idle speed of the engine, and including in particular the following steps:
    i) a command to open the purge valve (31) is issued,
    ii) the idle speed controller (ISC, 47) is operated using a PID controller (49) that has proportional (53), derivative (55) and integral (51) functions to cause it to act upon said engine idle speed without causing any appreciable variation in this speed in spite of the fact that the purge valve is open,
    iii) the data supplied to the engine control unit (ECU, PCM, 25) by the PID controller (49) is analyzed, and this data analysis is used to provide diagnostics information regarding the operation of at least one of the purge device (28) and said purge valve (31), characterized in that said analysis comprises analyzing the change in the integral function in order to diagnose whether the purge device (28) is operating correctly.

2. The method as claimed in claim 1, characterized in that said analysis comprises the following steps:
    a) storing in the memory of the engine control unit (ECU, PCM, 25) at least one value read from the integral function of the PID controller (49) associated with the idle speed controller (ISC, 47) before the command to open the purge valve (31) is issued,
    b) supplying the engine control unit with at least one value read from the integral function of the PID controller (49) once the command to open said purge valve has been issued,
    c) comparing the values read at steps a) and b),
    d) establishing the diagnosis on the basis of the results of the comparison performed.

3. The method as claimed in claim 2, characterized in that the diagnosis of step d) is made against a pre-established threshold value.

4. The method as claimed in claim 1, characterized in that when the command to open the purge valve (31) is issued, at least one of this purge valve and the air supply valve (23) located in the inlet manifold (5) is operated in such a way that at least one of the rate and amplitude of opening is tailored to ensure that the idle speed is maintained without appreciable variation, in conjunction with action of at least one of the PID controller (49) and the idle speed controller (ISC, 47).

* * * * *

UNITED STATES PATENT AND TRADEMARK OFFICE
CERTIFICATE OF CORRECTION

PATENT NO.        : 7,503,320 B2
APPLICATION NO.   : 11/797957
DATED             : March 17, 2009
INVENTOR(S)       : Thierry Collet It is certified that error appears in the above-identified patent and that said Letters Patent is hereby corrected as shown below:

In the drawings, Sheet 2, Fig. 2, "N (tours/mn)" should be changed to --N (rpm)--:

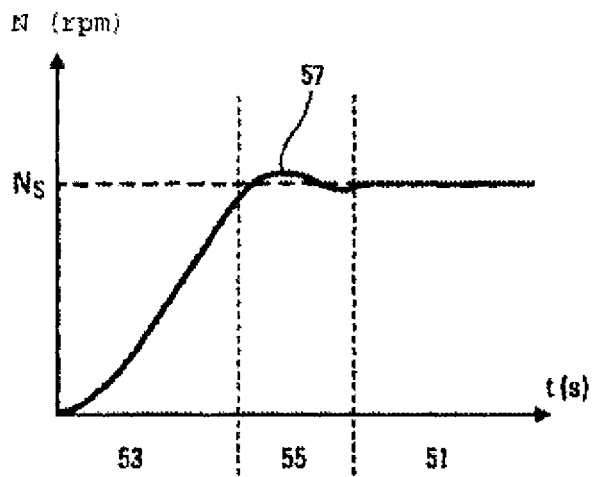

Fig. 2

Signed and Sealed this

Fourteenth Day of July, 2009

JOHN DOLL
*Acting Director of the United States Patent and Trademark Office*